(12) United States Patent
Gouda et al.

(10) Patent No.: US 12,104,103 B1
(45) Date of Patent: Oct. 1, 2024

(54) PHOTOLUMINESCENT POLYPROPYLENE NANOFIBERS-REINFORCED POLYETHYLENE TEREPHTHALATE EMBEDDED WITH STRONTIUM ALUMINATE PHOSPHOR

(71) Applicant: KING FAISAL UNIVERSITY, Al-Ahsa (SA)

(72) Inventors: Mohamed Gouda, Al-Ahsa (SA); Hany Mohamed Abd El-Lateef Ahmed, Al-Ahsa (SA); Mai Mostafa Khalaf Ali, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/411,280

(22) Filed: Jan. 12, 2024

(51) Int. Cl.
| | |
|---|---|
| *C09K 11/02* | (2006.01) |
| *C08J 5/18* | (2006.01) |
| *C08K 3/22* | (2006.01) |
| *C08L 67/02* | (2006.01) |
| *C09K 11/08* | (2006.01) |
| *C09K 11/77* | (2006.01) |

(52) U.S. Cl.
CPC .......... *C09K 11/02* (2013.01); *C08J 5/18* (2013.01); *C08K 3/22* (2013.01); *C08L 67/02* (2013.01); *C09K 11/7706* (2013.01); *C08J 2367/02* (2013.01); *C08J 2423/12* (2013.01); *C08K 2003/2227* (2013.01); *C08K 2201/005* (2013.01); *C08K 2201/011* (2013.01); *C08L 2203/16* (2013.01); *C08L 2205/16* (2013.01)

(58) Field of Classification Search
CPC ... C09K 11/02; C09K 11/025; C09K 11/0838; C09K 11/7706; C09K 11/717; C09K 11/7721; C09K 11/7734; C08K 2003/2227; C08K 2201/005; C08K 2201/011; C08L 67/02; C08L 2203/12; C08L 2203/16; C08L 2205/16; C08J 2367/02; C08J 2423/12
See application file for complete search history.

(56) References Cited

U.S. PATENT DOCUMENTS

| | | |
|---|---|---|
| 2008/0149561 A1 | 6/2008 | Chu et al. |
| 2020/0173076 A1 | 6/2020 | Cataldo et al. |

FOREIGN PATENT DOCUMENTS

| | | | |
|---|---|---|---|
| CN | 108468096 A | * 8/2018 | ............ C09K 9/00 |

OTHER PUBLICATIONS

Guo et al., "Photochromic Properties of Rare-earth Strontium Aluminate Luminescent Fiber", Fibers and Polymers, vol. 12, No. 7, pp. 875-879. (Year: 2011).*
Machine translation of CN108468096A, 7 pages. (Year: 2018).*
Mohamed E. El-Hefnawy et al.; "Immobilization of Strontium Aluminate into Recycled Polycarbonate Plastics towards an Afterglow and Photochromic Smart Window"; Polymers 2023, 15(1), 119; https://doi.org/10.3390/polym15010119.
Heng Lin et al.; "Encapsulation of Polyethylene for Strontium Aluminate Phosphors to Enhance its Water Resistance"; Advanced Materials Research (vols. 393-395), Nov. 2011, pp. 84-87 DOI: https://doi.org/10.4028/www.scientific.net/AMR.393-395.84.
Hatun H. Alsharief et al.; "Immobilization of strontium aluminate nanoparticles onto plasma-pretreated nonwoven polypropylene fibers by screen-printing toward photochromic textiles"; Journal of Materials Research and Technology vol. 20, Sep.-Oct. 2022, pp. 3146-3157.

* cited by examiner

*Primary Examiner* — Matthew E. Hoban
*Assistant Examiner* — Lynne Edmondson
(74) *Attorney, Agent, or Firm* — Nath, Goldberg & Meyer; Joshua B. Goldberg

(57) ABSTRACT

A photochromic material can include nanoparticles of lanthanide-activated strontium aluminate (NLSA) embedded into polyethylene terephthalate (PET). The PET may further include electrospun polypropylene nanofibers (PPNF) incorporated therein. In some embodiments, the photochromic material may be transparent. In other embodiments, the photochromic material may be scratch resistant. In some embodiments, the photochromic material may be configured to form concrete. In still other embodiments, the photochromic material may be configured to form windows. The electrospun polypropylene nanofibers may be a roughening agent in the PET. The photochromic material may exhibit a green coloration after exposure to ultraviolet (UV) light. The NLSA may have a diameter of about 80 nm to about 120 nm. The PPNF may have a diameter of about 75 nm to about 180 nm. The photochromic material may be superhydrophobic.

19 Claims, 7 Drawing Sheets

PHOTOLUMINESCENT POLYPROPYLENE NANOFIBERS-REINFORCED POLYETHYLENE TEREPHTHALATE EMBEDDED WITH STRONTIUM ALUMINATE PHOSPHOR

BACKGROUND

1. Field

The disclosure of the present patent application relates to a photochromic material and, particularly, to a photoluminescent polypropylene nanofibers-reinforced polyethylene terephthalate embedded with strontium aluminate phosphor materials.

2. Description of the Related Art

Smart materials are employed in the creation of protection goods owing to their ability to respond to potentially harmful external stimuli such as extremely high temperatures and hazardous substances. Some smart materials either continue to emit light after switching off the illumination source, showing afterglow emission, or emit light beneath the excitation source to show fluorescence. Light-stimulated material may continue to emit light for a few seconds, showing phosphorescence, or for hours, showing afterglow emission.

Photochromism is the term for a light-stimulated change in color that takes place in a material when it is exposed to an illumination source and then regains its original color when the illumination source is moved away. Photochromism may have application in concrete, windows, anti-counterfeiting devices, electronic displays, ophthalmic lenses, sensors, and packaging.

Most materials that have UV-induced photochromism are colored using organic colorants. However, the limitations of UV-induced chromic organic pigments include poor photostability, photochromism inhibition, and expensive cost, which restricts their applicability. The organic pigments photochromism relies on have structural switching. Thus, their photochromic activity is frequently inhibited by steric effects brought on by immobilization in bulk materials. Additionally, continued exposure to UV light may cause organic colorants to gradually photodegrade, resulting in poor photostability. However, no steric effects occur with photochromic inorganic colorants. As a result, photochromic inorganic colorants have enhanced photochromic properties and strong photostability.

Due to their excellent photostability, strontium aluminate phosphors (SAPs) have better resistance to fatigue. SAPs are recyclable, non-radioactive, and non-toxic. Among other luminous lanthanide-doped inorganic pigments they have great brightness, strong afterglow emission (>10 h), and excellent resistance to water, heat, light and chemicals. The ratio of SAPs in the material is necessary for determining the target application, including photochromism or afterglow. SAPs have therefore been preferred for use in a variety of smart products.

Alkaline earth aluminate is incorporated into a polycarbonate matrix as a novel technique for enhancing smart windows with a transparent appearance, photochromism, and afterglow. These windows have an energy-saving nature, a tough surface, high optical transmittance, are inexpensive to produce, and highly durable.

Thus, a photochromic material formed of recycled materials is desired.

SUMMARY

To develop photochromic materials with persistent afterglow emission, such as concrete and smart windows, electrospun polypropylene nanofibers (PPNF) are incorporated into polyethylene terephthalate (PET), such as, by way of non-limiting example, PET films or sheets, for reinforcement. Nanoparticles of lanthanide-activated strontium aluminate (NLSA) are physically embedded into the polyethylene terephthalate films to produce transparent PPNF-PET smart sheets. Electrospinning is utilized to create PPNF, which is subsequently included as a roughening agent into PET sheets.

Green coloration detected upon exposing the PPNF-PET film to ultraviolet (UV) light was verified by spectral analyses using photoluminescence and International Commission on Illumination (CIE) Lab parameters. The PPNF-PET hybrids with low quantities of NLSA were found to immediately reverse this emission activity after removing the ultraviolet source, which suggest fluorescence emission. Afterglow photoluminescence was detected at higher phosphor concentrations in PPNF-PET by slow reversibility of the light emission, which suggests glow in the dark emission. After 365 nm of excitation, a 517 nm emission band could be monitored from the PPNF-PET hybrids.

The chemical structure of NLSA was verified by X-ray diffraction (XRD). Transmission electron microscope (TEM) and scanning electron microscope (SEM) were utilized to explore the morphological properties of NLSA and PPNF, showing diameters of 80-120 nm and 75-180 nm, respectively. X-ray fluorescence (XRF), energy-dispersive X-ray (EDXA), and SEM were employed to investigate the morphological features of PPNF-PET smart sheets.

As compared to a NLSA-free polyethylene terephthalate control sample, the PPNF-PET smart sheets demonstrated improved scratch resistance. The hydrophobicity and UV resistance of the PPNF-PET smart sheets were improved with an increase in the concentration of NLSA.

Accordingly, in an embodiment, the present subject matter relates to a photochromic material that can include nanoparticles of lanthanide-activated strontium aluminate (NLSA) embedded into polyethylene terephthalate (PET). The PET may further include electrospun polypropylene nanofibers (PPNF) incorporated therein. In some embodiments, the material may be transparent. In other embodiments, the material may be scratch resistant. In some embodiments, the material may be configured to form concrete. In still other embodiments, the material may be configured to form windows. The electrospun polypropylene nanofibers may be a roughening agent in the PET. The photochromic material may exhibit a green coloration after exposure to ultraviolet (UV) light. The NLSA may include a diameter of about 80 nm to about 120 nm. The PPNF may include a diameter of about 75 nm to about 180 nm. The photochromic material may be superhydrophobic.

These and other features of the present subject matter will become readily apparent upon further review of the following specification.

DETAILED DESCRIPTION OF THE PREFERRED EMBODIMENTS

Figure 1A:
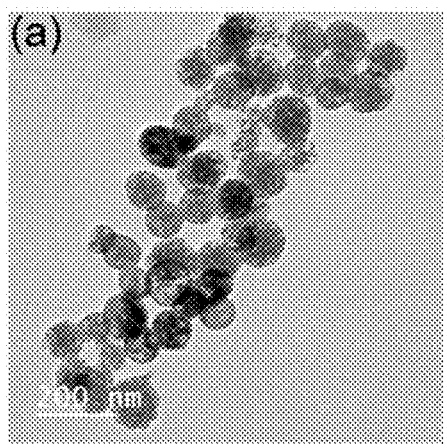
FIGS. 1A, 1B, and 1C shows transmission electron microscope (TEM) photos of embodiments of nanoparticle lanthanide-activated strontium aluminate (NLSA) as described herein.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

A photochromic material as described herein can include nanoparticles of lanthanide-activated strontium aluminate (NLSA) embedded into polyethylene terephthalate (PET). The PET may further include electrospun polypropylene nanofibers (PPNF) incorporated therein. In some embodiments, the photochromic material may be transparent. In other embodiments, the photochromic material may be scratch resistant. In additional embodiments, the photochromic material may be configured to form concrete. In still other embodiments, the photochromic material may be configured to form windows. The electrospun polypropylene nanofibers may be a roughening agent in the PET. The photochromic material may exhibit a green coloration after exposure to ultraviolet (UV) light. The NLSA may have a diameter of about 80 nm to about 120 nm. The PPNF may have a diameter of about 75 nm to about 180 nm. The photochromic material may be superhydrophobic.

In another embodiment, the present subject matter relates to a method of forming photochromic material as described herein that can begin with electrospinning of polypropylene nanofibers (PPNF). The electrospinning tool used in this regard has three essential components, including a syringe pump, a high voltage power supply, and a collector. Then a polypropylene solution in dimethylformamide is stirred for at least about 2 hours, about 2 hours, or about 1.5 to about 2.5 hours. The solution undergoes sonication for at least about 30 minutes, about 30 minutes, or about 25 to about 35 minutes to accomplish homogeneity. The thus obtained polypropylene viscous solution can be inserted into a plastic syringe with a needle tip. The polypropylene viscous solution is exposed to injection at a flow rate of 1 mL/hr. The polypropylene nanofibers (PPNF) are obtained at a rotation rate of 150 rpm. The needle tip of the syringe is placed at about 20 cm from the collector. The colored parts of the PPNF can then be removed.

Separately, polyethylene terephthalate such as, by way of non-limiting example, recycled polyethylene terephthalate waste, is exposed to heating at about 250° C. to about 260° C., or about 255° C., which leaves behind a transparent plastic. The given polyethylene terephthalate (PET) is then stirred with the PPNF obtained above and nanoparticles of lanthanide-activated strontium aluminate (NLSA) at about 250° C. to about 260° C., or about 255° C., until the combination becomes colorless. The colorlessness indicates a lack of NLSA aggregations to assure a homogeneous dispersion of PPNF and NLSA in the polyethylene terephthalate (PET).

Different amounts of NLSA, including 0% (NLSA0), 0.5% (NLSA1), 1% (NLSA2), 2% (NLSA3), 4% (NLSA4), 6% (NLSA5), 8% (NLSA6), 10% (NLSA7), and 12% (NLSA8) w/w, are used in the creation of polyethylene terephthalate sheets. Films are cast by decanting solutions onto sheet-like Teflon molds. After cooling for at least about 12 hours at room temperature, the provided sheets can be at least about 5 cm thick, about 7 cm long, and about 3 cm wide.

The following examples illustrate the present teachings.

Example 1

Electrospinning Procedure Used for Fabricating PPNFs

Polypropylene solution (10%; w/v) in dimethylformamide was stirred for 2 hours and sonication occurred (25 kHz) for 30 minutes to accomplish homogeneity. The provided viscous solution (5 mL) was inserted into a plastic syringe (15 mL) with a needle tip (stainless steel). The polypropylene viscous solution was exposed to injection at a flow rate of 1 mL/h. The polypropylene nanofibers (PPNF) were obtained at a rotation rate of 150 rpm. The stainless steel tip was placed at 20 cm from collector.

Example 2

Fabrication of PPNF-PET Film (PPNF@PET)

Recycled polyethylene terephthalate waste was exposed to heating at 255° C., leaving behind a transparent plastic. The polyethylene terephthalate was stirred (150 rpm) with PPNF (5%) and NLSA at 255° C. until the combination became colorless, indicating the lack of NLSA aggregations to assurance a homogeneous dispersion of PPNF and NLSA in polyethylene terephthalate. Different amounts of NLSA, including 0% (NLSA$_0$), 0.5% (NLSA$_1$), 1% (NLSA$_2$), 2% (NLSA$_3$), 4% (NLSA$_4$), 6% (NLSA$_5$), 8% (NLSA$_6$), 10% (NLSA$_7$), and 12% (NLSA$_8$) w/w, were used in the creation of polyethylene terephthalate sheets. Films were cast by decanting solutions onto sheet-like Teflon molds. After cooling for 12 h at room temperature, the provided sheets were 5 cm thick, 7 cm long, and 3 cm wide.

Example 3

Characterization of Photochromic Material

Figure 1B:
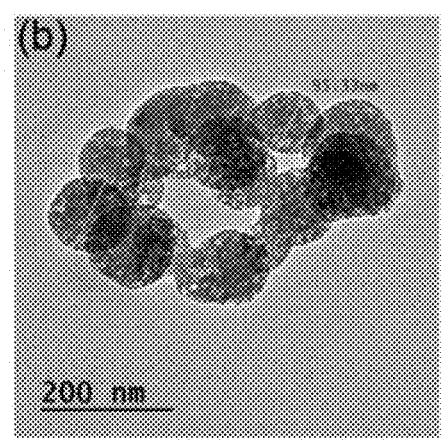
Figure 1C:
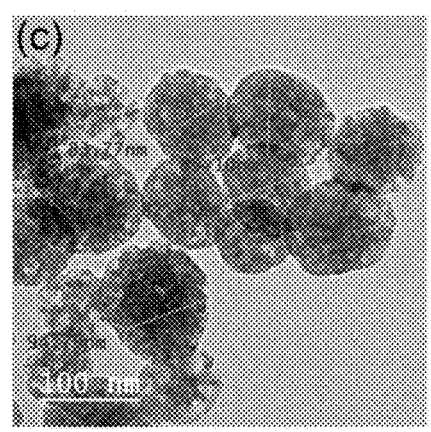

The high temperature solid state approach was used to synthesize LSA microparticles. The top-down method was then used to create nanoparticles of LSA (NLSA). Based on TEM analysis, NLSA displayed diameters in the range from 80 nm to 120 nm as illustrated in FIGS. 1A-1C. Nanoparticles can usually keep their matrix transparency. Thus, the inclusion of the NLSA ensured that the PPNF-PET blocks maintained their colorless appearance.

Figure 2:
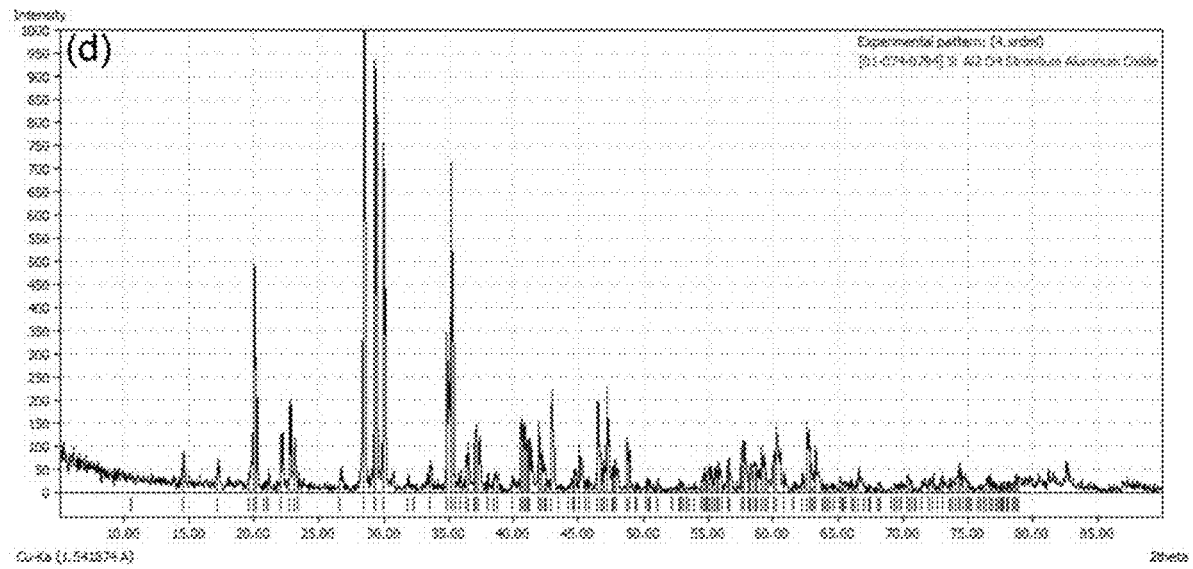
FIG. 2 shows an x-ray diffraction (XRD) spectral analysis of NLSA (top) and the equivalent standard spectrum (bottom).

An XRD spectra of NLSA and its equivalent standard spectrum are illustrated in FIG. 2. The XRD signals of NLSA were observed to match the pure monoclinic phase of strontium aluminum oxide (JCPDS card No. 01-074-0794). No crystal phases were detected for dopants ($Eu^{2+}$ and $Dy^{3+}$). Additionally, no signals were monitored for starting materials to confirm a low temperature monoclinic phase. Different contents of NLSA were used to produce PPNF@PET hybrids of different properties. Polypropylene nanofibers were prepared via electrospinning. The current simple method successfully creates commercially viable multifunctional PPNF@PET sheets with UV protection, superhydrophobicity, afterglow, and photochromism.

Figure 3A:
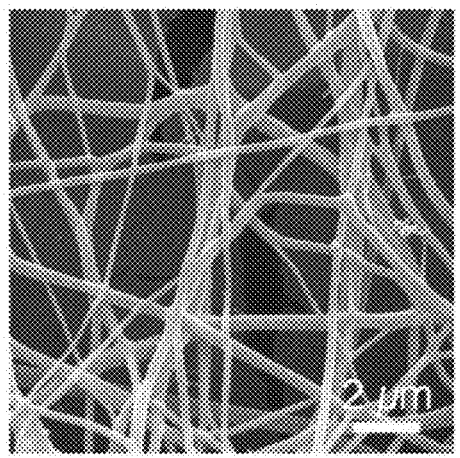
FIGS. 3A, 3B, and 3C shows SEM analysis of the electrospun polypropylene nanofibers.
Figure 3B:
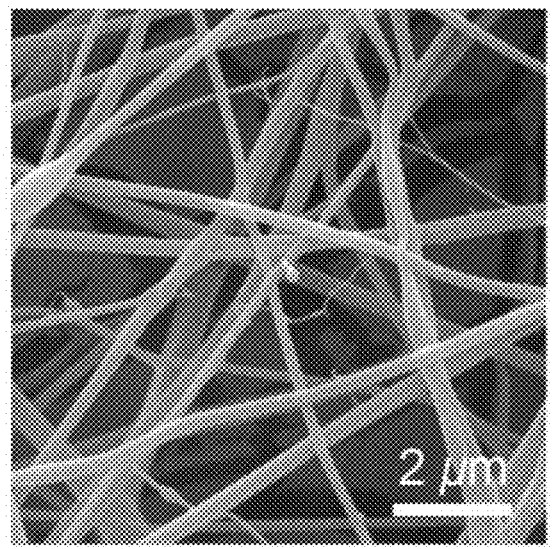
Figure 3C:
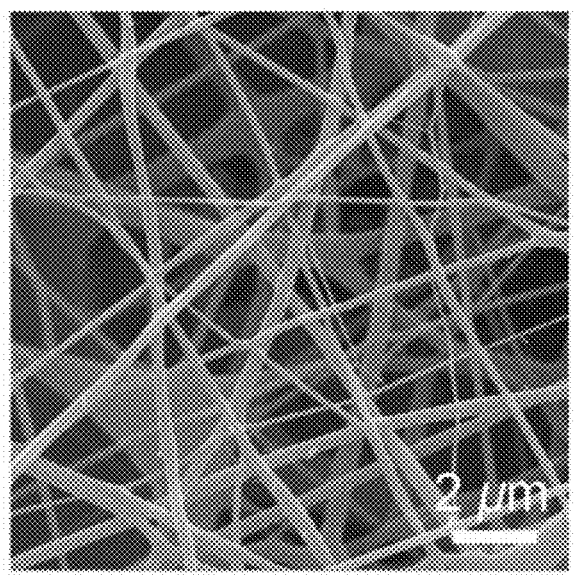
Figure 4A:
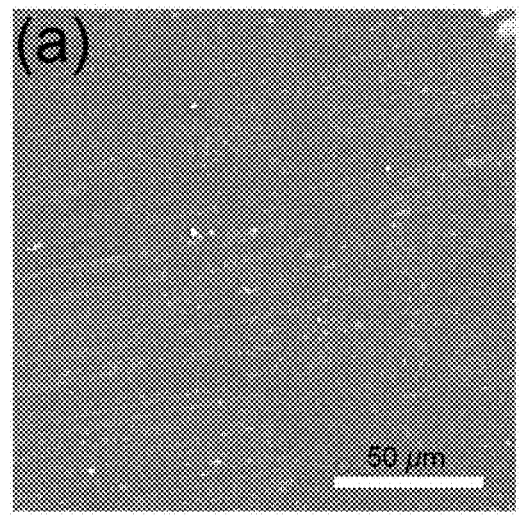
FIG. 4A-4D shows SEM analysis of embodiments of PPNF-PET photochromic materials with various NLSA contents by weight percent, with FIGS. 4A and 4B depicting $NLSA_0$ and FIGS. 4C and 4D depicting $NLSA_6$.
Figure 4B:
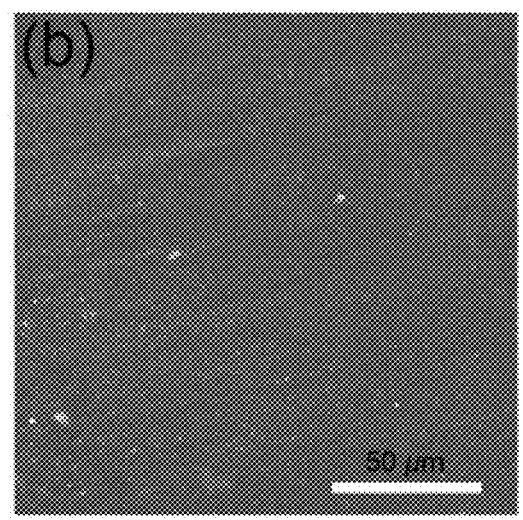
Figure 4C:
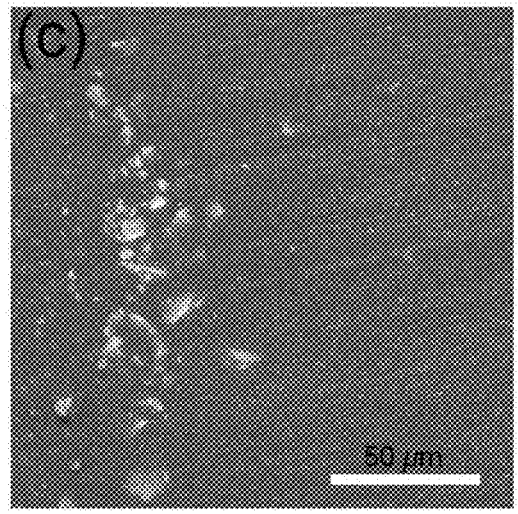
Figure 4D:
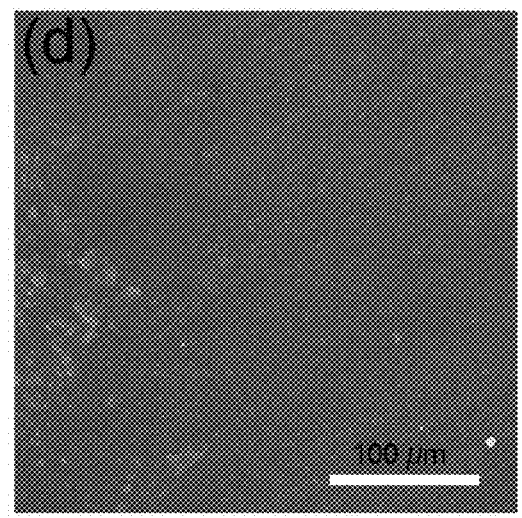

The topographical properties of PPNF and PPNF-PET are shown in FIGS. 3A-3C and FIG. 4. Table 1, below, displays the results of an elemental composition EDX study (wt %) performed on PPNF-PET at three locations on the substrate surface. SEM images demonstrating a diameter range of 75-180 nm for the prepared PPNF are illustrated in FIGS. 3A-3C. Increases in the NLSA ratio had no effect on the topology of the PPNF@PET sheets, as illustrated in FIG. 4. The phosphor particles are entirely incorporated in the PPNF-PET molded bulk as none of the tested films displayed NLSA nanoparticles on their surfaces.

EDX examination of the processed molded films verified the existence of alkaline earth aluminate in the polyethylene terephthalate bulk. The chemical composition of the PPNF-PET sheets was investigated at three different sites. The findings demonstrated that NLSA were uniformly distributed in the PPNF-PET sheet with almost identical elemental concentrations at the three examined locations. The presence of several components was confirmed by EDX, as shown in Table 1, below. The detected elemental components comprised oxygen and carbon as its principal constituents since polyethylene terephthalate functioned as a major bulk hosting agent, whereas PPNF acted as the reinforcing agent. Due to the low concentration of NLSA, additional elements, including dysprosium, aluminum, strontium, and europium, were determined in the PPNF-PET sheet in very small concentrations.

TABLE 1

Elemental determination (wt %) of PPNF@PET as conducted by EDXA at different sites ($L_1$, $L_2$ and $L_3$).

| PPNF@PET | | C | O | Sr | Al | Dy | Eu |
|---|---|---|---|---|---|---|---|
| NLSA$_0$ | $L_1$ | 69.45 | 30.62 | 0 | 0 | 0 | 0 |
| | $L_2$ | 69.27 | 30.78 | 0 | 0 | 0 | 0 |
| | $L_3$ | 69.56 | 30.53 | 0 | 0 | 0 | 0 |

TABLE 1-continued

Elemental determination (wt %) of PPNF@PET as conducted by EDXA at different sites ($L_1$, $L_2$ and $L_3$).

| PPNF@PET | | C | O | Sr | Al | Dy | Eu |
|---|---|---|---|---|---|---|---|
| $NLSA_1$ | $L_1$ | 68.01 | 30.72 | 0.35 | 0.56 | 0.03 | 0.25 |
| | $L_2$ | 68.52 | 30.28 | 0.29 | 0.66 | 0.07 | 0.28 |
| | $L_3$ | 68.26 | 30.84 | 0.34 | 0.51 | 0.03 | 0.12 |
| $NLSA_3$ | $L_1$ | 67.90 | 31.73 | 0.66 | 1.28 | 0.14 | 0.33 |
| | $L_2$ | 67.73 | 31.81 | 0.66 | 1.32 | 0.10 | 0.39 |
| | $L_3$ | 67.99 | 31.69 | 0.54 | 1.29 | 0.18 | 0.40 |
| $NLSA_6$ | $L_1$ | 59.72 | 31.83 | 3.32 | 4.36 | 0.35 | 0.50 |
| | $L_2$ | 59.95 | 31.58 | 3.07 | 4.61 | 0.33 | 0.48 |
| | $L_3$ | 59.43 | 31.40 | 3.62 | 4.91 | 0.24 | 0.41 |
| $NLSA_8$ | $L_1$ | 56.60 | 31.46 | 4.24 | 6.75 | 0.46 | 0.50 |
| | $L_2$ | 55.67 | 31.93 | 4.84 | 6.56 | 0.49 | 0.51 |
| | $L_3$ | 56.38 | 31.81 | 4.12 | 6.63 | 0.40 | 0.66 |

Table 1 Elemental Determination (Wt %) of PPNF@PET as Conducted by EDXA at Different Sites ($L_1$, $L_2$ and $L_3$).

Luminescent PPNF-PET sheets were subjected to XRF examination, the results of which are demonstrated in Table 2, below. The elemental analysis of a particular material can be accurately explored by EDXA method. Contrarily, X-ray fluorescence (XRF) can only detect metals at contents as low as 10 ppm. Because of this, XRF can be utilized as a technique of partial elemental analysis. Therefore, Al and Sr are the only elements that can be detected by XRF in the PPNF-PET sheets. However, the exceedingly low contents of Eu and Dy rendered them undetectable. The elements determined in NLSA and PPNF-PET were discovered to have molar ratios that were almost equal to those employed in their preparation procedures.

TABLE 2

| | Contents (wt %) | | | |
|---|---|---|---|---|
| Elements | $NLSA_1$ | $NLSA_3$ | $NLSA_6$ | $NLSA_8$ |
| Si | 99.08 | 94.52 | 91.42 | 86.31 |
| Al | 0.51 | 3.05 | 5.56 | 8.54 |
| Sr | 0.41 | 2.43 | 3.02 | 5.12 |

Table 2 XRF-Based Elemental Determination (Wt %) of PPNF@PET.

Example 4

Photoluminescence Analysis

The PPNF-PET hybrid concretes immobilized with NLSA showed reversible emissions. However, the concretes samples with NLSA concertation of 1% or less displayed an immediate reversibility to designate fluorescence emission. Owing to delayed reversibility, an afterglow emission with a continuous emission in the dark was detected for the concrete samples with NLSA contents over 1%.

Figure 5:
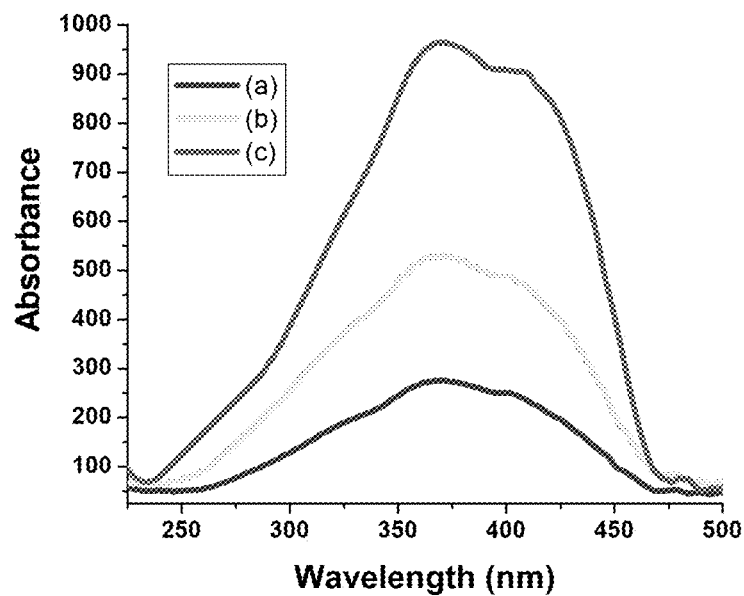
FIG. 5 shows a graph of the excitation analysis of embodiments of PPNF-PET photochromic material at various NLSA contents by weight percent, i.e., $NLSA_1$ (a), $NLSA_6$ (b), and $NLSA_8$ (c).
Figure 6:
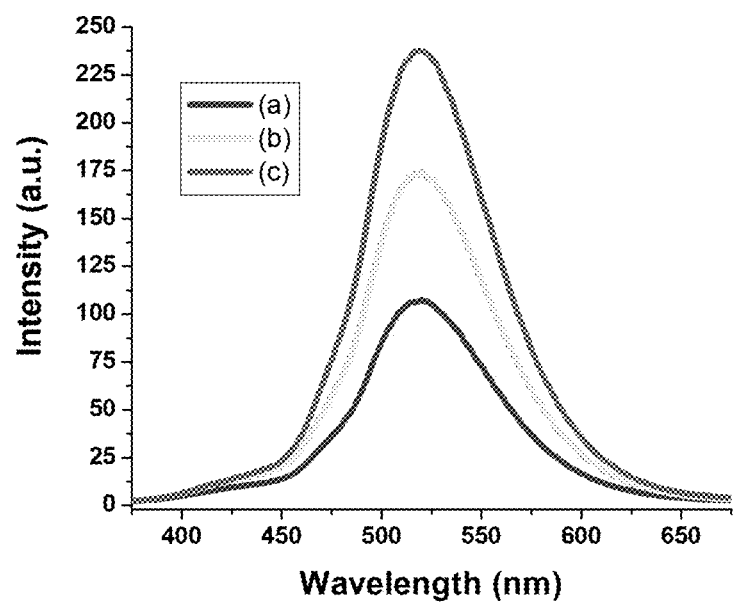
FIG. 6 shows a graph of the emission spectra of PPNF@PET photochromic material ($NLSA_6$) as a function of the ultraviolet illumination duration, i.e., 50 s (a), 100 s (b), and 150 s (c).

The excitation spectra of the PPNF-PET hybrid concrete immobilized with NLSA are shown in FIG. 5. The excitation band at 365 nm was found to be more prominent when the NLSA ratio was increased. FIG. 6 shows the emission spectra of $NLSA_6$ as a function of the ultraviolet illumination duration. At a 365 nm excitation wavelength, a 517 nm emission peak was detected. It was discovered that extending the ultraviolet-irradiation period from 50 s to 150 s resulted in a larger emission band intensity at 517 nm. Bonding between the polymeric strands of PPNF-PET was enhanced by the incorporation of NLSA due to the formation of coordinating links between aluminum in NLSA and the polyethylene terephthalate carbonyl.

NLSA were included into the PPNF-PET composite to produce a colorless molded film. The $4f \leftrightarrow 5d$ transition of Eu(II) results in a green emission at 517 nm. This demonstrates that only Eu(II) emission band impacted the photoluminescence spectra, whereas Eu(III) emission was undetectable in the emission spectra. Strong greenish emission was observed when UV light was used to illuminate the sample, but transparency was observed when visible light was used.

As a thin film, the current PPNF-PET material can be used in diverse anti-counterfeiting uses due to photochromism from colorless to green due to the exposure to UV light. The current PPNF-PET hybrid can be used to make gaskets by simply slicing a certain design into a rectangular shape. The provided gasket displays a colorless form during the daylight hours but becomes visibly green beneath UV light. The fabricated PPNF-PET substrates were proven to be opaque by optical transparency testing. The transmittance of light decreased slightly as the proportion of NLSA in PPNF-PET rose, from 95% for $NLSA_1$ to 89% for $NLSA_8$. The $NLSA_1$ and $NLSA_8$ samples seemed colorless during the daytime but displayed a green color when irradiated with ultraviolet. Due to the colorless appearance of the photoluminescent PPNF-PET hybrid composites in daylight, they can be easily utilized to create security encoding labels for commercial items. Typically, the $4f^65d^1 \leftrightarrow 4f^7$ transition of $Eu^{2+}$ is accountable for the LSA emission. It seems that $Eu^{3+}$ has been replaced by $Eu^{2+}$ since neither $Eu^{3+}$ nor $Dy^{3+}$ emission peaks are present. The return of $Eu^{2+}$ to the ground state was also shown to be aided by $Dy^{3+}$, since it was revealed that this cation causes the formation of traps. Photostability and durability are essential for afterglow and photochromic products. Thus, the photoluminescent PPNF-PET hybrid was subjected to several UV and darkness light illumination cycles, indicating no shifts in the emission intensity to confirm its remarkable reversibility.

Example 5

Hydrophobicity and Ultraviolet Shielding

It is well-established that a superhydrophobic surface has a contacting angle >150° and a slide angle <10°. Once NLSA were embedded in the PPNF-PET molds, the contacting angles increased from 144.5° for $NLSA_0$ to 145.2° for $NLSA_1$. When the NLSA contents were increased from $NLSA_1$ to $NLSA_6$, the contact angle was improved from 145.2° to 154.6°, respectively. The surface roughness was enhanced when NLSA concentration was raised. The roughness and contacting angles; however, were slightly decreased in $NLSA_7$ and $NLSA_8$, falling to 154.3° and 153.8°, respectively.

Figure 7:
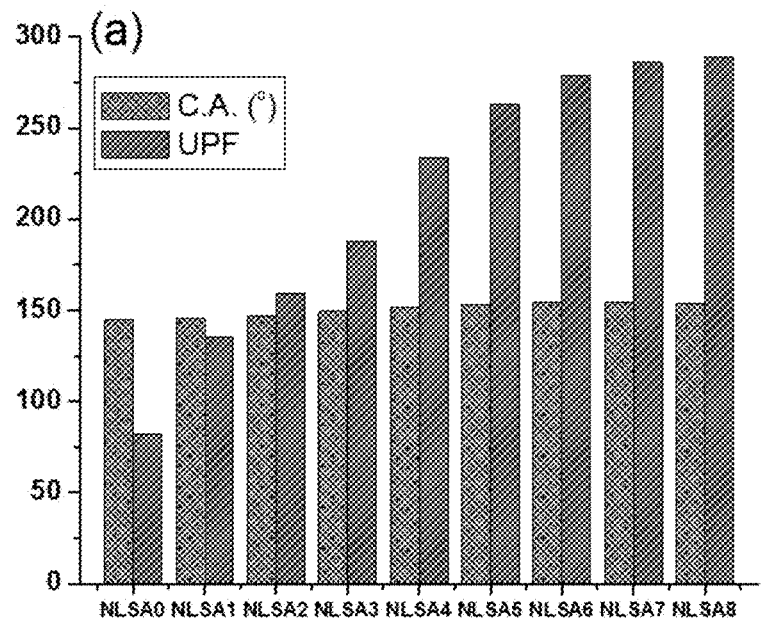
FIG. 7 shows a graph of contacting angles (C.A.) and ultraviolet protection factors (UPF) of embodiments of the photochromic material at various NLSA contents.
Figure 8:
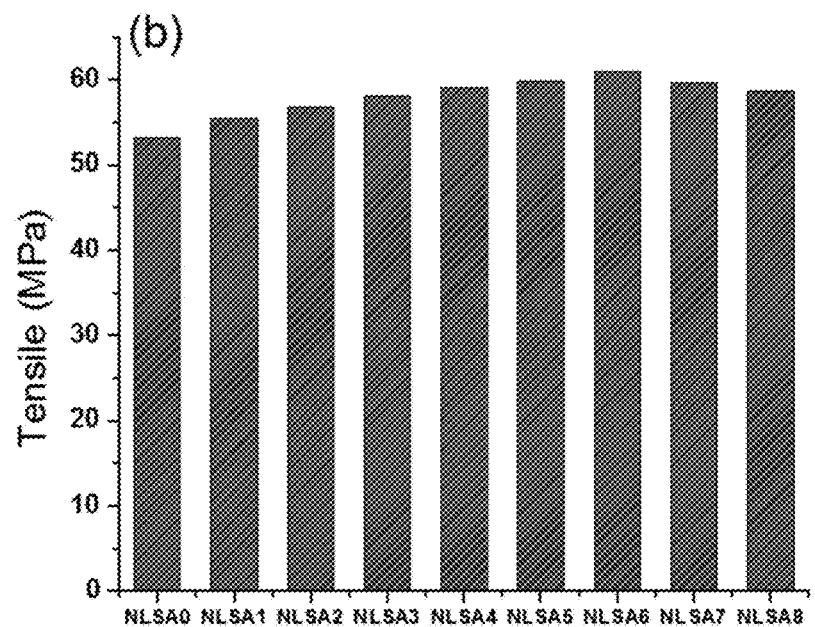
FIG. 8 shows a graph of tensile strength of embodiments of the photochromic material at various NLSA contents.

UV-protective smart windows can guard against erythema, sunburns, and skin cancer. UV blocking experiments were performed on luminescent PPNF@PET substrates, and the findings are shown in FIG. 7. When compared to plain concrete ($NLSA_0$), the photoluminescent PPNF-PET sample ($NLSA_1$) that was merged with the lowest concentration of NLSA has a much greater UV absorption capacity as shown in FIG. 7. This means it can protect against the sun harmful rays. By raising the NLSA ratio, the UV protection afforded by PPNF-PET was enhanced. This indicates that the constructed transparent PPNF-PET hybrid that produces light in the dark might be employed to make energy-efficient smart windows. In bright sunshine, the photochromic PPNF-PET hybrid allows a lot of ultraviolet light to penetrate into the building. The resulting green hue from ultraviolet (UV) rays blocks as much as 76% of natural light from entering the building. In low-light conditions, the PPNF-PET hybrids return to their transparent form, letting in more natural light.

It is to be understood that the photochromic materials described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A photochromic material, comprising:
nanoparticles of lanthanide-activated strontium aluminate (NLSA) embedded into polyethylene terephthalate (PET), wherein the PET incorporates electrospun polypropylene nanofibers (PPNF) therein; wherein the NLSA have a diameter of about 80 nm to about 120 nm, or wherein the PPNF have a diameter of about 75 nm to about 180 nm.

2. The photochromic material of claim 1, wherein the photochromic material is transparent.

3. The photochromic material of claim 1, wherein the photochromic material is scratch resistant.

4. The photochromic material of claim 1, wherein the photochromic material is configured to form concrete.

5. The photochromic material of claim 1, wherein the photochromic material is configured to form windows.

6. The photochromic material of claim 1, wherein the electrospun polypropylene nanofibers (PPNF) are a roughening agent in the polyethylene terephthalate (PET).

7. The photochromic material of claim 1, wherein the photochromic material exhibits a green coloration after exposure to ultraviolet (UV) light.

8. The photochromic material of claim 1, wherein the NLSA have a diameter of about 80 nm to about 120 nm.

9. The photochromic material of claim 1, wherein the PPNF have a diameter of about 75 nm to about 180 nm.

10. The photochromic material of claim 1, wherein the photochromic material is superhydrophobic.

11. A photochromic material, comprising:
electrospun polypropylene nanofibers (PPNF), wherein the electrospun polypropylene nanofibers include nanoparticles of lanthanide activated strontium aluminate (NLSA) embedded therein; and
polyethylene terephthalate (PET) films having the PPNF comprising the NLSA embedded therein,
wherein the photochromic material is transparent;
wherein the NLSA have a diameter of about 80 nm to about 120 nm, or wherein the PPNF have a diameter of about 75 nm to about 180 nm.

12. The photochromic material of claim 11, wherein the photochromic material is configured to form concrete.

13. The photochromic material of claim 11, wherein the photochromic material is configured to form windows.

14. The photochromic material of claim 11, wherein the electrospun polypropylene nanofibers are a roughening agent in the polyethylene terephthalate (PET).

15. The photochromic material of claim 11, wherein the photochromic material exhibits a green coloration after exposure to ultraviolet (UV) light.

16. The photochromic material of claim 11, wherein the NLSA have a diameter of about 80 nm to about 120 nm.

17. The photochromic material of claim 11, wherein the PPNF have a diameter of about 75 nm to about 180 nm.

18. The photochromic material of claim 11, wherein the photochromic material is scratch resistant.

19. The photochromic material of claim 11, wherein the photochromic material is superhydrophobic.

* * * * *